No. 794,287. PATENTED JULY 11, 1905.
A. A. FAUST.
ARTICLE OF FOOD.
APPLICATION FILED AUG. 27, 1904.

Inventor
Anna A. Faust,
By Victor J. Evans
Attorney

Witnesses
Edwin G. McKee
F. W. Hough

No. 794,287. Patented July 11, 1905.

UNITED STATES PATENT OFFICE.

ANNA A. FAUST, OF BALTIMORE, MARYLAND.

ARTICLE OF FOOD.

SPECIFICATION forming part of Letters Patent No. 794,287, dated July 11, 1905.

Application filed August 27, 1904. Serial No. 222,432.

*To all whom it may concern:*

Be it known that I, ANNA A. FAUST, a citizen of the United States, residing at Baltimore, in the State of Maryland, have invented a new and useful Improved Article of Food, of which the following is a specification.

This invention relates to an improved cake, and has for its object to produce an article of this character which may be inexpensively manufactured and one which will present an attractive tempting appearance.

To these ends the invention comprises the improved form of blank employed and the method involved in the production of the cake, as more fully hereinafter described.

Figure 1:
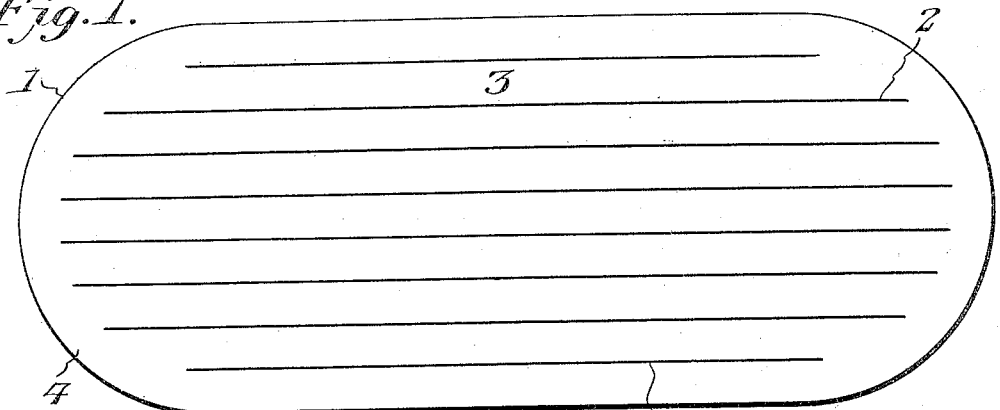
Figure 2:
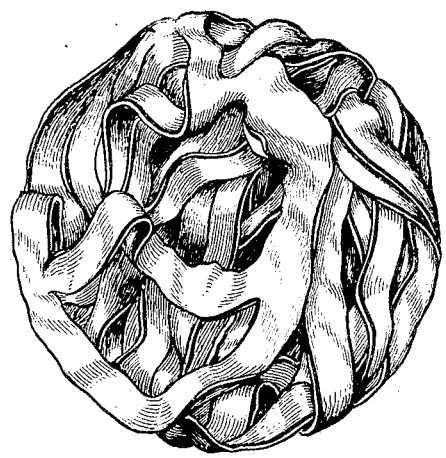

In the accompanying drawings, Figure 1 is a view of the improved blank. Fig. 2 is a plan view, and Fig. 3 is a side elevation, of the completed cake.

Referring to the drawings, and particularly to Fig. 1, it will be seen that I employ a blank 1, composed of dough or other foodstuff rolled or otherwise formed into a flat sheet or layer and having a series of longitudinal incisions 2, preferably arranged in parallel relation and uniformly spaced apart to produce a series of ribbons 3, arranged in transverse juxtaposition, the incisions 2 being terminated suitably remote from the ends of the blank, whereby the ribbons 3 are connected at their ends by webs 4 and the blank preferably having its ends of semicircular form, as shown.

Figure 3:

Having produced the blank above described, the same is placed into a suitable utensil and partially cooked and thereafter manipulated by folding the blank back and forth upon itself or by twisting the blank to cause the ribbons 3 to separate and intermingle, as illustrated in Figs. 2 and 3, after which the cooking operation is allowed to progress to completion.

From the foregoing it is apparent that a cake of attractive tasteful appearance will be produced, it being understood that any appropriate food compound or material and flavored in any desired manner may be employed in the production of the cake-blank.

It will be understood that while I now believe the form of blank herein described and the manner of manipulating the same during the cooking operation to be the best adapted for the ends in view minor changes in the details of construction herein set forth may be resorted to without departing from the spirit of the invention.

Having thus described the invention, what is claimed as new is—

1. An article of food comprising a plurality of ribbons of foodstuff intercommingled and cooked, the ends of the ribbons being connected together by continuous webs.

2. An article of food comprising a plurality of ribbons of cereal foodstuff irregularly intercommingled and cooked, the ends of the ribbons being connected by continuous webs.

In testimony whereof I affix my signature in presence of two witnesses.

ANNA A. FAUST.

Witnesses:
GEO. L. MATTINGLY,
EDGAR KOHNERT.